(12) United States Patent
Weiler et al.

(10) Patent No.: US 11,052,807 B2
(45) Date of Patent: Jul. 6, 2021

(54) HOPPER CLEANOUT

(71) Applicant: Weiler, Inc., Knoxville, IA (US)

(72) Inventors: Patrick Weiler, Pella, IA (US); William Hood, Reasnor, IA (US); Brett Huizer, Knoxville, IA (US)

(73) Assignee: WEILER, INC., Knoxville, IA (US)

( * ) Notice: Subject to any disclaimer, the term of this patent is extended or adjusted under 35 U.S.C. 154(b) by 181 days.

(21) Appl. No.: 16/169,349

(22) Filed: Oct. 24, 2018

(65) Prior Publication Data
US 2020/0130556 A1 Apr. 30, 2020

(51) Int. Cl.
*B60P 1/36* (2006.01)
*B65G 15/30* (2006.01)
*B65G 43/00* (2006.01)
*B65G 67/30* (2006.01)

(52) U.S. Cl.
CPC ............... *B60P 1/36* (2013.01); *B65G 15/30* (2013.01); *B65G 43/00* (2013.01); *B65G 67/30* (2013.01); *B65G 2201/042* (2013.01); *B65G 2203/042* (2013.01)

(58) Field of Classification Search
CPC .......................... E01C 2301/04; E01C 2301/02
See application file for complete search history.

(56) References Cited

U.S. PATENT DOCUMENTS

| | | |
|---|---|---|
| 3,678,817 A | 7/1972 | Martenson et al. |
| 3,967,912 A | 7/1976 | Parker |
| 3,997,277 A | 12/1976 | Swisher, Jr. et al. |
| 4,012,160 A | 3/1977 | Parker |
| 4,473,319 A | 9/1984 | Spangler |
| 5,015,120 A * | 5/1991 | Brock ............. B60P 1/38 404/108 |
| 5,044,819 A | 9/1991 | Kilheffer et al. |
| 7,484,911 B2 | 2/2009 | Frelich |
| 8,282,312 B2 | 10/2012 | Braddy et al. |
| 8,469,630 B2 | 6/2013 | Olson et al. |
| 8,894,323 B2 | 11/2014 | Rutz et al. |
| 8,944,719 B2 | 2/2015 | Frelich et al. |
| 8,979,423 B2 | 3/2015 | Smieja |
| 9,011,038 B2 | 4/2015 | Buschmann |
| 9,109,333 B2 | 8/2015 | Campbell et al. |
| 9,151,004 B2 | 10/2015 | Anderson et al. |
| 9,505,567 B2 * | 11/2016 | Swearingen .......... B65G 67/02 |
| 9,702,095 B1 | 7/2017 | Narsingh et al. |

(Continued)

FOREIGN PATENT DOCUMENTS

WO PCT/JP92/01308 4/1993

*Primary Examiner* — Mark C Hageman
(74) *Attorney, Agent, or Firm* — David M. Breiner; BrownWinick Law Firm

(57) ABSTRACT

A method and means to manage timing and delivery of paving material to refill a paver during a paving operation is provided. The invention employs a semi-automated dump routine to manage the level and condition of material in the dump hopper of the material transfer vehicle (MTV) thereby minimizing flaws in the roadbed otherwise expected. Further, the invention provides for monitoring and managing multiple operational data pertaining to delivery of material related to the paving process to determine and coordinate timing of travel and delivery of the paving material to increase optimal conditions of the paving material to minimize road and pavement defects.

17 Claims, 7 Drawing Sheets

(56) References Cited

U.S. PATENT DOCUMENTS

| | | |
|---|---|---|
| 9,708,779 B2 * | 7/2017 | Brown .................... E01C 19/48 |
| 2005/0131645 A1 | 6/2005 | Panopoulos |
| 2015/0166274 A1 | 6/2015 | Swearingen |
| 2018/0022559 A1 * | 1/2018 | Knutson ............ A01D 41/1217 |
| | | 340/942 |

* cited by examiner

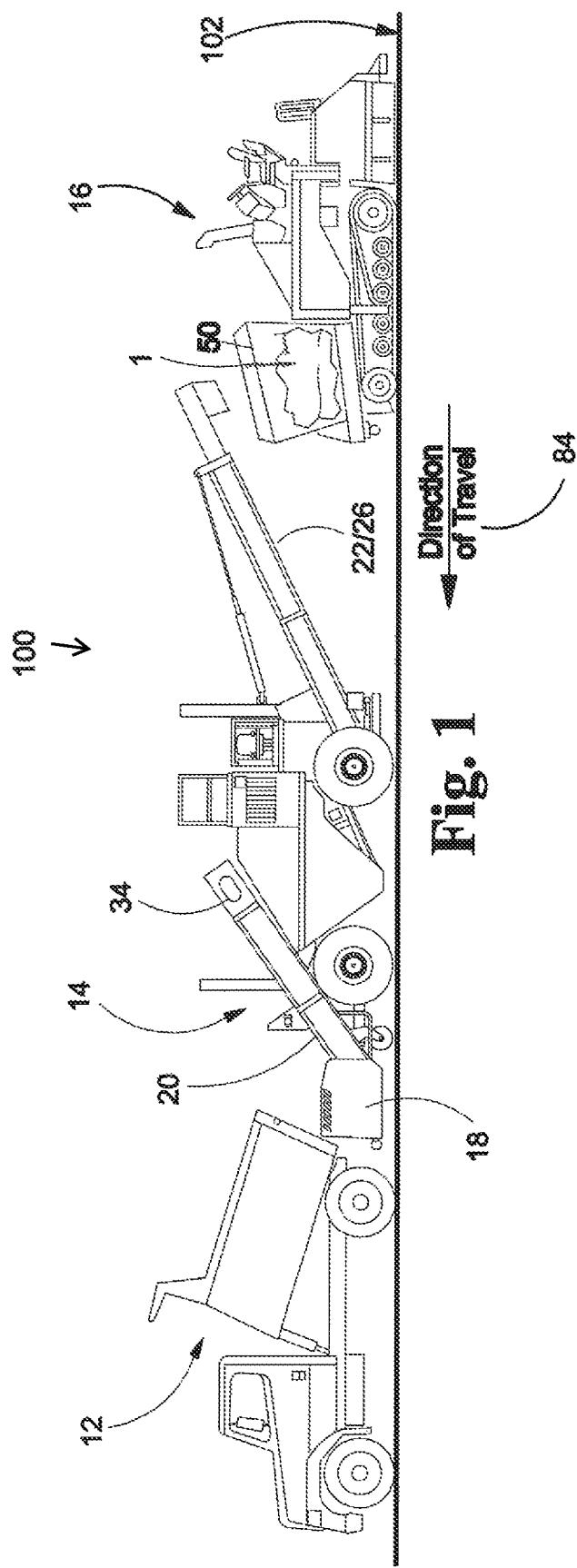
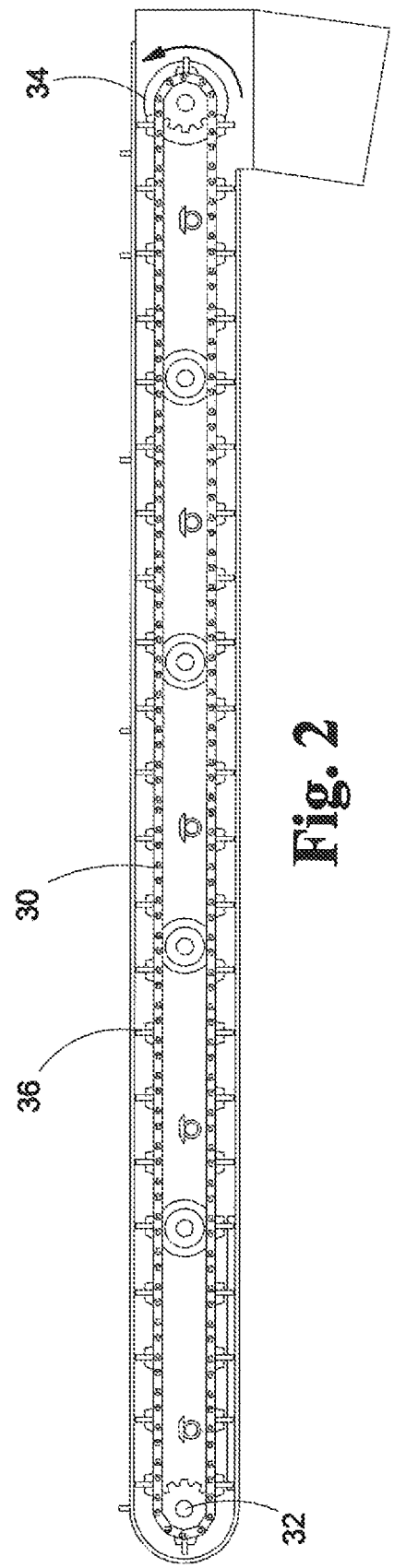
Fig. 1
Fig. 2

HOPPER CLEANOUT

BACKGROUND OF THE INVENTION

1. Field. This disclosure relates to improving efficiency of a paving operation in terms of both labor and time. A variety of equipment and materials are needed in order to pave a road. In today's world, paving a road is often accomplished by a combination of machines working in a coordinated, cooperative manner without stopping. The act of paving requires, generally but without limitation, timely application of paving material to a prepared road bed. Paving is a process and requires an adequate and consistent supply of paving material at a temperature and consistency favorable for creating a smooth, continuous road bed. Further, the paving process requires means to lay or apply the paving material on the prepared roadbed in such a way that the resulting road surface is generally uniform. Applying or laying the paving material in a consistent manner creates a smooth and uniform road. The present invention relates to systems, assemblies, and methods for applying a material to a road surface.

2. Description of Related Art. Before road construction begins, the road is carefully designed. The final design is influenced by factors such as the expected traffic volume, and the soil properties and topography of the area where the road will be constructed. Further, the road design needs to account for pre-existing or planned utility lines, drainage, and sewers. Finally, the climate may affect the road's design and the materials used in the road as may the current and expected density of population expected to use the road and the purpose it will serve (for example, whether the road's use is expected to serve mostly residential or mostly commercial needs).

Once a design is created, the real work begins. The area on which the road will be laid is cleared. Thereafter, a combination of excavation and bulldozing is used to shape and mount dirt across the road. Then the road is graded to smooth and level the surface. Next a base of soil, concrete and limestone is applied for stability. Finally, asphalt is poured and laid. Sometimes several layers of material are laid to form the road to obtain adequate stability and longevity.

Asphalt is typically laid using a paver. A paver includes means to move forward along the roadbed as the asphalt is laid and is run by an operator. It includes a hopper into which asphalt is filled, typically by a truck driven by a second operator. The truck brings the asphalt to the hopper on a just-in-time basis. Coordinating the delivery of the asphalt has long been a challenge to the efficiency of the road construction process and the resulting road quality.

Conveyors on or associated with the paver move the asphalt material through the paver from the front of the paver (relative to the direction of travel) to the rear where screw conveyors move the material onto the road bed. Thereafter, a screed smooths the surface. If the paver stops moving during application of the asphalt to the road bed or does not move at a relatively uniform speed, lateral joints in the pavement or other imperfections in the road surface occur reducing the smoothness of the road. High compaction screeds may be employed as means to increase the likelihood of obtaining a smooth surface. Typically, rollers follow behind the paver. If the asphalt is applied to the road bed in a consistent manner and compaction by the screed is done well, fewer passes of the rollers are required to achieve the specified final degree of compaction. This general description addresses the general operation of most pavers, however, differences may be present from model to model. For example, certain tools may be used to determine if the road bed is adequately smoothed, or to determine if the hopper is nearly empty, etc. Those differences are intended to be included by this description.

The asphalt in the paver's hopper will, of course, eventually run out. And, if the paver is moving at relatively high speeds such that asphalt is used at a rapid rate, a paver can create a hurry-up-and-wait paving sequence if the paver runs out of asphalt before the next truck arrives. Alternatively, arrival of the next load of asphalt before the paver needs it causes inefficiencies in time. Further, if the truck in which the asphalt is being transported does not include means to maintain the temperature of the asphalt, the asphalt may cool while the truck awaits transfer of its contents to the paver (or to a material transfer vehicle, MTV, to be described more fully below) resulting in a poorer quality road bed. When this happens, the smoothness and quality of the road surface suffers, not to mention the efficiency of the paving operation.

Establishing a continuous paving process, without stops, starts, and breaks in process for filling the paver's hopper will deliver a smoother road. Accomplishing these objectives requires a great deal of planning and coordination between plant production, trucking needs and the paving train's speed. Sometimes it is difficult to continuously lay material with a paver alone, as truck exchanges are slow and hopper capacity is limited. Therefore, material transfer vehicles (MTVs) (see FIG. 1) have been devised as means to deliver the additional surge capacity needed to help contractors better establish a continuous paving process to produce a higher quality, smoother mat and provide non-contact paving.

The first MTVs were developed in the late 1980s, which corresponded with a change in mix designs to a larger aggregate. Large aggregate mixtures were used at the turn of the century but were the subject of U.S. Pat. No. 727,505 granted to the Warren Brothers. The Court's decision in a lawsuit in Kansas in 1909 suggested that mixes with smaller maximum aggregate size did not infringe on the patent, so producers went to smaller aggregates to avoid infringement. Thereafter, producers became comfortable with the smaller aggregates and continued their use. However, as traffic volume and wheel loads increased, the smaller aggregate did not adequately withstand the punishment. Larger size aggregate mixtures had a resurgence in the late 1980s, mostly as heavy-duty type mixes. The change to a larger aggregate increased the occurrences of segregation, especially between truck exchanges, thereby reducing the quality of the road-beds.

MTVs were initially created solely for the purpose of continuous paving. Early versions of MTVs featured large storage bins to allow extra paving time in between truck exchanges. These MTV designs did not feature reblending capabilities and the asphalt in the hopper cooled at varying rates depending on its position relative to the outer wall of the hopper and the amount of asphalt in the hopper. These inconsistencies in temperature resulted in inconsistency in road texture/smoothness.

In the mid 1990's some manufacturers began equipping MTVs with some type of reblending system on the basis that thermal segregation can be just as detrimental to the life of the road as other anomalies and non-uniform character. MTV's with large storage capacities and reblending capabilities gave contractors the necessary material surge to pave continuously at higher speeds, allowing more tons to be laid in a shorter amount of time without interruption. Specifically, the use of the MTV allowed for better timing and more consistent temperature of the material used to make the road bed. Generally, an MTV includes a loading hopper into which paving material is unloaded, a first transfer mechanism to move the paving material to its larger storage hopper, and a second transfer mechanism to allow transfer of material out of the larger storage hopper and over to the paver. These transfer mechanisms often take the form of conveyors.

In some prior art MTV embodiments as described (and as shown in FIG. 1), a middle feeder may be employed in the storage hopper to move material up and out of the storage hopper to the second feeder. However, there are other ways to convey the material in the storage hopper to the second feeder which may include, for example, equipping the storage hopper with a closeable opening in the bottom which may be selectively opened to allow material to flow out via gravity and onto the second feeder. Alternatively, the middle feeder may include any one or more of a belt conveyor or an elevator with paddles or other means known in the art to convey particulate matter thereby transferring the material in the hopper to the second feeder to be delivered thereafter to the paver. Other mechanical arrangements may likewise be employed to remove material from storage hopper.

The first feeder of an MTV typically includes an auger system to mix the asphalt and feed the asphalt to the second feeder via the storage hopper. The second feeder, is, in turn, configured to move the asphalt from the storage hopper on the MTV and deliver it to the paver hopper on the paver.

In a typical the paving train 100 as shown by FIG. 1, the first feeder 20 on the MTV 14 and the second feeder may be of like configuration or of alternative configurations known in the art for conveying particulate matter.

If stoppage or slow down occurs in the paving process due, for example, to running short on paving material before the next load arrives, the quality of the resulting road mat suffers; if material cools before it is applied, the desired uniformity of application may not be achievable. If the speed of the paving train's movement is not, generally, consistent speed the application may be uneven. Stoppages caused by the lack of availability of material before the next load is delivered are equally detrimental to the road mat. So, delivering the material either too soon or too late can result in a quality reduction of the road mat.

It is, also, important relative to the quality of the road mat to fully empty the hopper of material before the next truck arrives. If the hopper is not fully emptied, the material remaining cools. The new load of material arrives and is hotter; the cooled material will segregate resulting in poor quality road mat.

Many advancements relating to the use of pavers and MTV's have been accomplished. Advancements to the pavers and MTV's include employing automatic distance control of the MTV relative to the paver. Another improvement provides automatic speed control of the feeder conveyors that move the asphalt from the MTV to the paver to maintain a set level of material in the paver hopper. Yet another improvement comprises the use of lights to communicate with trucks bringing paving material to alert them when a new load of asphalt will be needed and when the dumping sequence is complete.

In conventional operation, the person unloading the paving material from the truck directly to the paving machine manually operates a switch for the dump hopper on the MTV after the truck has filled the dump hopper. To determine the appropriate time to initiate and the rate at which to dump the loading hopper, the operator considers the speed of the conveyor/augers used to remove material from the storage hopper as well as the amount of asphalt present in the storage hopper; the operator will make an educated guess as to when it is appropriate to dump/empty the loading hopper and at what rate it should be dumped to maximize the dump rate while preventing an overload of the MTV's feeder system. After all material has been emptied/removed from the loading hopper, the operator will then lower the loading hopper which can then accept another load of asphalt from the next truck. (FIG. 8 provides a flow chart illustrating the decision points in the process.) A sequence of events such as the one just described may be considered a "dump routine".

Damage to the machine may occur if an automated dump routine of the dump hopper (a.k.a. loading hopper) on the MTV is employed without consideration of proper measures. The current state of the art does not provide means for automating the start or stop of a dump routine related to emptying the dump hopper, nor does it disclose or describe means to monitor several factors that may indicate the machine is encountering problems relative to the dump routine. Providing an automated means to start or stop the dump routine would be advantageous relative to timing and efficiency, as well as to avoid damaging or interrupting the laying of the road mat. Monitoring certain factors would provide indicators of problems that may suggest that the routine should be shut down, or indicate a preferred rate of unloading material, or require a more optimal position of the dump hopper in order to accommodate changes in status of the indicators.

In prior art systems, a human operator is required to be present to track the several factors that may indicate dump routine problems. Further, as previously mentioned, one person is required to drive and load the paver with material and a second person to dump the trucks into the transfer vehicle. A human is required to dump material from the truck into a loading hopper to be conveyed to a hopper on the transfer vehicle. It is also the dump operator's job to determine when to start the dump routine based on the occurrence of several conditions, and when to stop or slow down the dump routine before damage occurs or at least before it becomes both extensive and expensive. The effectiveness of these activities in the prior art is almost entirely dependent on human judgment.

A paving train 100 shown in some detail at FIG. 1 is known and is used for applying asphalt to a road to construct a road mat 102. As shown in FIG. 1, the paving train 100 usually includes a dump truck 12, a material transfer vehicle (MTV) 14 shown in detail at FIG. 4), and a paver 16 (together, the paving train 100). The MTV 14 comprises a storage hopper 24 and a loading hopper 18. The MTV 14 usually also includes a first feeder (a.k.a. hopper conveyor) 20 and a second feeder 22. Sometimes an additional feeder is positioned in the storage hopper 24 to move material 1 in the hopper 24 to the second feeder 22. The paver 16 comprises its own hopper 50.

In some prior art embodiments as described, a middle feeder may be employed in the MTV storage hopper 24 to move material 1 in the MTV storage hopper 24 to the second feeder 22. However, there are other ways to convey the material 1 in the storage hopper 24 to the second feeder 22 which may include, for example, equipping the storage hopper 24 with a closeable opening in the bottom which may be selectively opened to allow material to flow out via gravity and onto the second feeder 22. Alternatively, the middle feeder may include any one or more of a belt conveyor or an elevator with paddles or other means known in the art to convey particulate matter. Other mechanical arrangements may likewise be employed to remove material 1 from storage hopper 24.

The first feeder 20 of the MTV 14 typically includes an auger system to mix the asphalt 1 and feed the asphalt 1 to the second feeder 22 via the storage hopper 24. The second feeder 22, is, in turn, configured to move the asphalt 1 from the storage hopper 24 on the MTV 24 and deliver it to the paver hopper 50 on the paver 16.

In alternate embodiments of the prior art, the storage hopper 24 is not present; in this case the first feeder 20 removes material 1 from the hopper 18 directly to the second feeder 22. Alternatively, the truck 12 may unload directly into first feeder 20 which, in turn unloads directly into paver 50.

In the paving train 100 as shown by FIGS. 1 and 2, the first feeder 20 on the MTV 14 may include a chain 30 driven by a sprocket and around idler 32. The chain is driven by a hydraulic motor 34. FIG. 2 is a cut-away, partial view of one embodiment comprising a chain 30 in the first feeder 20 equipped with paddles and/or slats 36 mounted on the chain 30 to transport material 1. The second feeder 22 may be of like configuration or of alternative configurations known in the art for conveying particulate matter.

If stoppage or slow down occurs in the paving process due, for example, to running short on paving material 1 before the next load arrives, the quality of the resulting road mat 102 suffers; and the desired uniformity of application may not be achievable. Temperature of the material and speed of the paving train both affect the quality and character of the roadmat. Stoppages caused by the lack of availability of material 1 before the next load is delivered are equally detrimental to the road mat. So, delivering the material 1 either too soon or too late, too hot, too cold, or unevenly can result in a quality reduction of the road mat 102.

It is, also, important relative to the quality of the road mat to fully empty the hopper 18 before the next truck 12 arrives. If the hopper 18 is not fully emptied, the material 1 remaining cools. When the new load of material 1 arrives it is hotter; the cooled material 1 segregates resulting in poor quality road mat 102. It is, therefore, important to fully empty the hopper 18 while the material 1 in the storage hopper 24 on the MTV 14 is being applied and while waiting for the arrival of the next truck 12 carrying material 1.

In prior art paving trains 100, an operator monitors the process and guesses or estimates when material 1 in the storage hopper 24 will need to be replenished by visually examining the level of material 1 in the storage hopper 24 or listening to engine speed which can be indicative of load. The operator considers this information, and makes an informed decision to predict when more material 1 will be needed, and then signals a driver of the truck 12 to bring the next load of material 1 so that, hopefully, it arrives before the storage hopper 24 is empty. But, it is critical in the prior art paving train arrangement 100 that the material 1 does not arrive so soon that the material 1 in the truck 12 measurably cools prior to its use so much that the quality of the road mat 102 is negatively affected. It is also important from the standpoint of efficiency to provide timely notification such that the driver's and operator's time will not be wasted and the number of trucks and drivers, and the time spent by drivers waiting and operators waiting to unload is minimized. The quality and costs of the road mat 102 being laid are negatively affected by these factors if they are not adequately managed.

Generally, in prior art arrangements, when the truck 12 arrives at the paving train 100, the driver unloads material 1 into the hopper 18 of the MTV, from which it is conveyed to the storage hopper 24 of the MTV and then used in accordance with the paver's 16 rate of movement and application.

Prior art methods do not include automated means to address the timing issues of the process for moving material 1 from truck 12 to the loading hopper 18 and from the hopper 18 to the storage hopper 24, relying instead mostly on driver and dump operator instinct and signaling. Further, a routine for emptying the loading hopper 18 to the storage hopper 24 before the next load arrives is implemented by a dump operator.

In order to fully empty the loading hopper 18, prior art methods require the dump operator to take into account several factors to decide when to initiate a dump routine and how fast to dump the hopper 18. The factors taken into consideration and the various actions taken by the operator in prior art arrangements for initiating and managing the emptying of the hopper 18 of the MTV 14 is illustrated by the decision tree shown at FIG. 8. As is known, the dump operator has to initiate movement of a chain 30 in a first feeder 20 to convey material from the loading hopper 18 to the storage hopper 24 and, further, determine when a dump routine to empty loading hopper 18 should be initiated; then, the dump operator is required to initiate the dump routine and, thereafter, determine when the dump routine is complete and should be reset. In addition to initiating and resetting, the operator also has to consider: whether the chain 36 is running and, if so, manually modulate dumping of the hopper 18 and monitor whether the chain 36 is running fast enough to move the material 1 out of the hopper 18 at a speed that will avoid stalling of the feeder system 20 yet accomplish the desired dump rate.

Measurable cooling or segregation of material 1 in the hopper 18 also has to be minimized which means a dump routine needs to be efficiently begun and run; once the material 1 is fully unloaded from the truck 12, the dump operator is required to initiate a dump routine for the purpose of removing material 1 from the loading hopper 18 to minimize or avoid material cooling and sticking to the hopper 24, or simply cooling and then causing quality issues in the next load of materials to be unloaded.

In an attempt to manage flow of materials, U.S. Pat. No. 9,505,567 to Roadtec, discloses means to control rate of material flow. But its arrangement does not include means to initiate or stop flow, or in any way manage the dump routine. The disclosed apparatus covers means to control the rate of introducing material to the surge bin. The disclosure describes employing sensors to monitor the physical level of asphalt and to control rate of delivery of asphalt from the paver's hopper to the paver's distributing auger, but suggests no more than that. It does not address remaining problems in the art. Therefore, there was a need for apparatus, method, or system to improve efficiency, and reduce costs, by at least partially automating the process of emptying the loading hopper in a paving train.

SUMMARY

As previously described, a driver of the truck delivering material, and a dump operator are often both employed in the prior art in order to increase the rate at which the loads can be unloaded into a hopper of a material transfer device (MTV) which, in turn, is run by an MTV operator. The inventive arrangement avoids the need to stop or slow the paving train 100, in turn reducing the number of trucks 12 and drivers 4 necessary to efficiently feed the paving train 100. In the present invention a dump operator is no longer required to initiate the dump routine and, once emptied, to reset the hopper 18 while the driver 4 drives the truck 12 back to be refilled with material 1.

The former method of using a dump operator is inefficient. But, the truck's driver must remain in the truck and the MTV operator needs to remain where he can operate the MTV which means there must be a dump operator to initiate the dump routine. Still, the dump process transferring material from the truck to the MTV would be more advantageous and much more efficient if the requirement for a person to function as the dump operator could be eliminated altogether. Further, it would be advantageous if the hurry-up-and-wait, inefficient scenario of expensive prior art dump routines, employing truck driver, dump operator, and MTV operator could be avoided.

Therefore, there was a need for means to automate the sequence and timing related to loading and transporting material to the paving train for just in time delivery. Increasing the efficiency of the initiation and termination of a dump routine was needed in order to provide a more consistent road mat without the inconsistencies that occur when human judgment dictates when the dump routine should be initiated or terminated. Therefore, several aspects of the process have been automated over the last several years in an effort to increase efficiency. For example, controls exist that automate the distance between the MTV and the paver, or that automatically control speed and on/off status of the feeder conveyors to the paver. However, until the present invention, there had not yet been devised a way to automate the dump routine of the loading hopper of the MTV, thereby removing the possibility of error by human judgment and increasing the efficiency of this portion of the road paving process, eliminating the need for a dump operator thereby conserving both time and labor expenses. This disclosure contemplates several interrelated methods and the mechanics required to initiate and operate those methods all intended to provide more efficient processes for paving roads including eliminating the need for a dump operator altogether.

The present invention provides a system for continuously providing an optimally adequate paving material supply to a paving machine while increasing efficiency and minimizing road quality issues. The system of the present invention provides means and method to provide and maintain adequate paving material in the storage hopper of a material transfer vehicle (MTV) via monitoring, managing, and measuring various fill, timing and travel factors. The present invention specifically addresses automation of a dump routine pertaining to the loading and unloading of the dump hopper of the MTV. Managing this routine via automatic initiation relative to specific conditions, and completing the necessary sequence without or with only minimal human intervention provides an operational advantage and efficiency over the prior art and addresses a long felt need.

The present invention provides means to automatically initiate, execute, and terminate a dump routine without complicated signaling or processing; it, therefore, differs markedly from the prior art paving train arrangements offering advantages not previously available.

BRIEF DESCRIPTION OF THE DRAWINGS

FIG. 1 is a diagram showing the arrangement of the system including a paver, MTV, and truck unloading, i.e., the paving train;

FIG. 2 is a cut-away view of a chain and sprocket relationship of a first feeder;

DETAILED DESCRIPTION OF THE INVENTION

Figure 3:
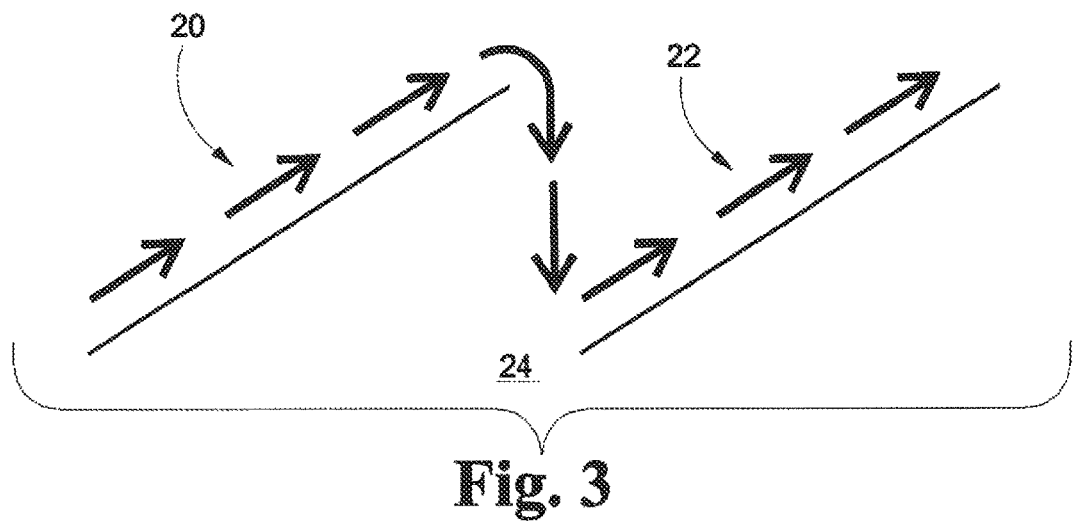
FIG. 3 is a diagram representing material flow through the MTV.
Figure 4:
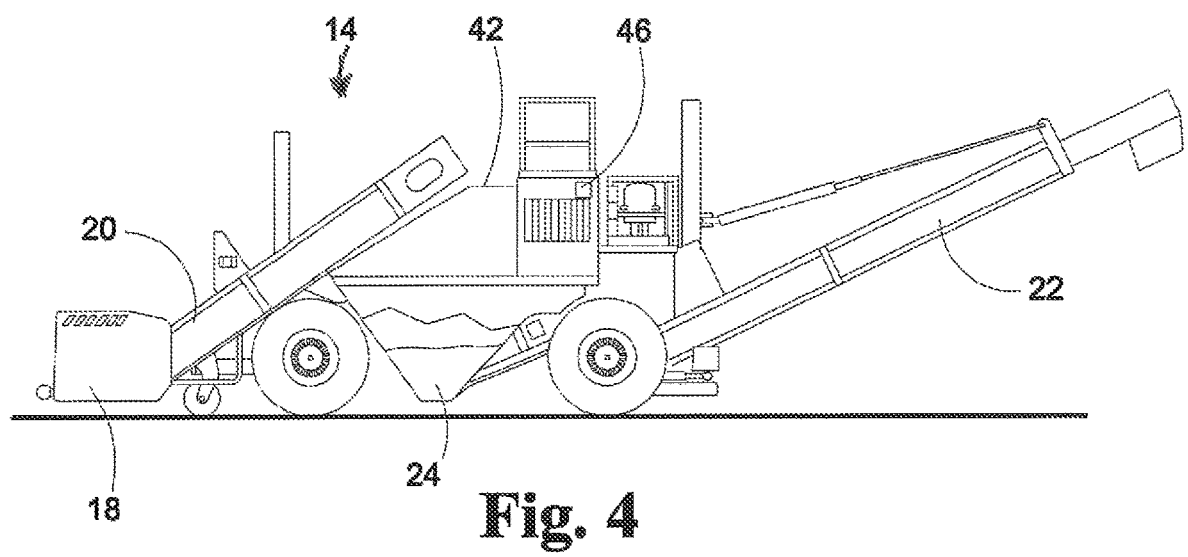
FIG. 4 is a more detailed representation of a MTV.

Example embodiments of the present invention will now be described more fully with reference to the accompanying drawings, in which example embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on," "connected to," or "coupled to" another element or layer, it can be directly on, connected to, or coupled to the other element or layer or intervening elements or layers that may be present. In contrast, when an element is referred to as being "directly on," "directly connected to," or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, and/or section from another elements, component, region, layer, and/or section. Thus, a first element component region, layer or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the structure in use or operation in addition to the orientation depicted in the figures. For example, if the structure in the figures is turned over, elements described as "below" or "beneath" other elements or features would then be oriented "above" the other elements or features. Thus, the exemplary term "below" can encompass both an orientation of above and below. The structure may be otherwise oriented (rotated 90 degrees or at other orientations) and the spatially relative descriptors used herein interpreted accordingly.

Embodiments described herein will refer to plan views and/or cross-sectional views by way of ideal schematic views. Accordingly, the views may be modified depending on manufacturing technologies and/or tolerances. Therefore, example embodiments are not limited to those shown in the views, but include modifications in configurations formed on the basis of manufacturing process. Therefore, regions exemplified in the figures have schematic properties and shapes of regions shown in the figures exemplify specific shapes or regions of elements, and do not limit example embodiments.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, example embodiments relate to systems and methods of applying a material, for example, asphalt, to a surface and improvements thereto.

The present invention improves upon prior art paving train arrangements. Specifically, in the present invention, a dump operator can be eliminated. In a first embodiment, (See FIG. 1) when the truck 12 reaches the paving train 100 the driver 4 moves the truck 12 into position to unload into the loading hopper 18 of the MTV 14. The MTV 14 is operated by an MTV operator. The truck driver 4 or the MTV operator initiates the loading hopper conveyor 20 wherein such initiation may be manual or may be via remote activator which sends a signal to a controller 46 or other means capable of turning on the loading hopper conveyor 20. One of the truck driver 4 or MTV operator causes the truck box 12a to be raised or otherwise unloads the truck 12 into the loading hopper 18 (which may alternatively include driving the truck over the unloading hopper and opening a trap in a floor of the truck box 12a allowing material to flow into the unloading hopper). Once the truck 12 is unloaded, the driver 4, or MTV operator lowers the truck box 12a or otherwise causes the truck box to return to its pre-unloading status (which may include returning the box to its pre-unloading position). Then either the driver of the truck 4 or the MTV operator employs the remote activator to send a signal to one or more controllers 46 to initiate the dump routine to more fully empty hopper 18 and transfer material 1 to the storage hopper 24. In a preferred embodiment, the routine is automated and is terminated by deactivating the loading hopper conveyor 20. In an embodiment, a receiver receives a signal from remote activator and said one or more controller 46 initiates the loading hopper conveyor 20 upon receipt of the first signal/command from the driver's remote activator, initiates the hopper dump routine upon receipt of a second command from the driver's remote activator and stops the first feeder or hopper conveyor 20 upon receipt of the third command from the driver's remote activator. The signals sent may all be the same, each successive signal initiating the next action in a predetermined order. Alternatively, the remote activator may include three different selectable buttons or signals, and the controller 46 associated with the receiver may be programmed to receive and process each of one or more, for example, three possible commands thereby allowing the driver 4 or MTV operator to optionally select stop and/or restart of the loading hopper conveyor 20 and/or initiate the dump routine at will. Alternatively, in a third embodiment, an electronic sensor or "eye" may be employed to detect the truck's 12 presence when it nears the loading hopper conveyor 20 and wherein upon receipt of a signal indicating the truck's presence, the controller 46 automatically initiates the loading hopper conveyor/first feeder 20, thereafter the driver 4 or MTV operator can initiate truck 12 unloading. Upon completion of the unloading process, the truck driver 4 may simply drive away; the electronic sensor or eye then detects the truck's 12 absence and signals the controller 46 which then initiates the dump routine to transfer the remainder of material 1 in the loading hopper 18 to storage hopper 24 and then automatically terminates the operation of the loading hopper conveyor 20 upon detection of a predetermined value related to RPMs, Pressure, or occurrence of a pre-set time lapse.

In one embodiment of the inventive paving train 100, signals related to the full or empty status of the storage hopper 24 may be received by the controller 46. The controller 46 may, in response, compare the signal to known or expected values, thereafter adjusting the speed of the feeder 20, 22 or other mechanism to control the rate of unloading the storage hopper 24. Alternatively, the controller 46 may compare the signal to a known or expected value to determine when/if a truck 12 should be loaded and/or begin travel toward the MTV 14 in order to avoid stoppage. These values may be processed by the controller 46, taking geographic positions of the next truck 12 and the storage hopper 24 into account and an expected time to load and speed of travel to determine when to initiate travel of a material-filled truck 12 toward the paving train 1 to provide just-in-time delivery of material 1 to the loading hopper 18, said controller 46 accordingly sending a signal to initiate loading of the next truck 12 and subsequent travel.

In an alternative embodiment, the electronic controller 46 of the present invention may simply detects the presence or absence of a condition 302 related to the changing amount of paving material 1 in any one or more of the MTV storage hopper 24, the paver's hopper 50, or the loading hopper 18 (e.g., above or below a certain vertical level of material remaining, or its weight, or the status (e.g., on/off) of the feeder 22 or of hopper conveyor 20. Upon detection of the change in condition 302, the controller 46 may generate a signal 304 to cause initiation of travel of a truck 12 toward the paving train 100 to deliver additional material 1. Upon detection of changes in other conditions 302, the controller 46 may generate a signal 306 or may otherwise directly initiate the dump routine to clear material 1 from the MTV's loading hopper 18 in accordance with one of the previously discussed embodiments.

Figure 5:
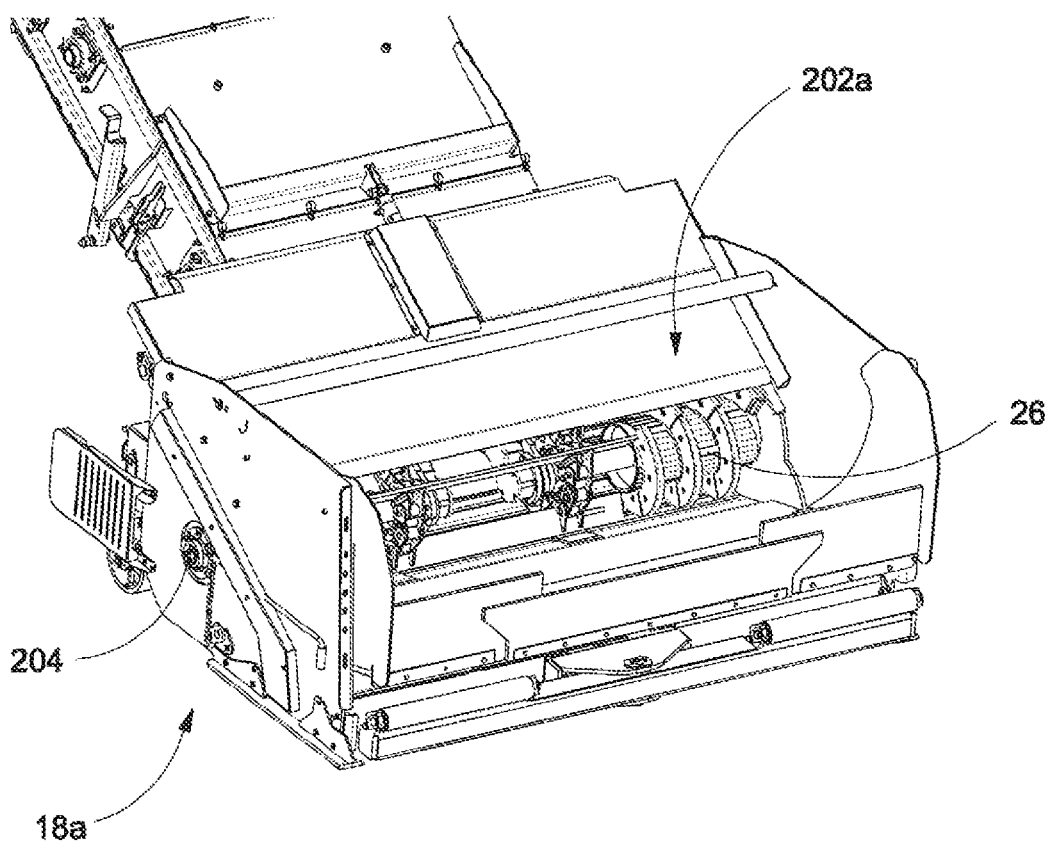
FIG. 5 shows the MTV loading hopper down with flow-control baffle in an open first position ready to receive material from a truck.
Figure 6:
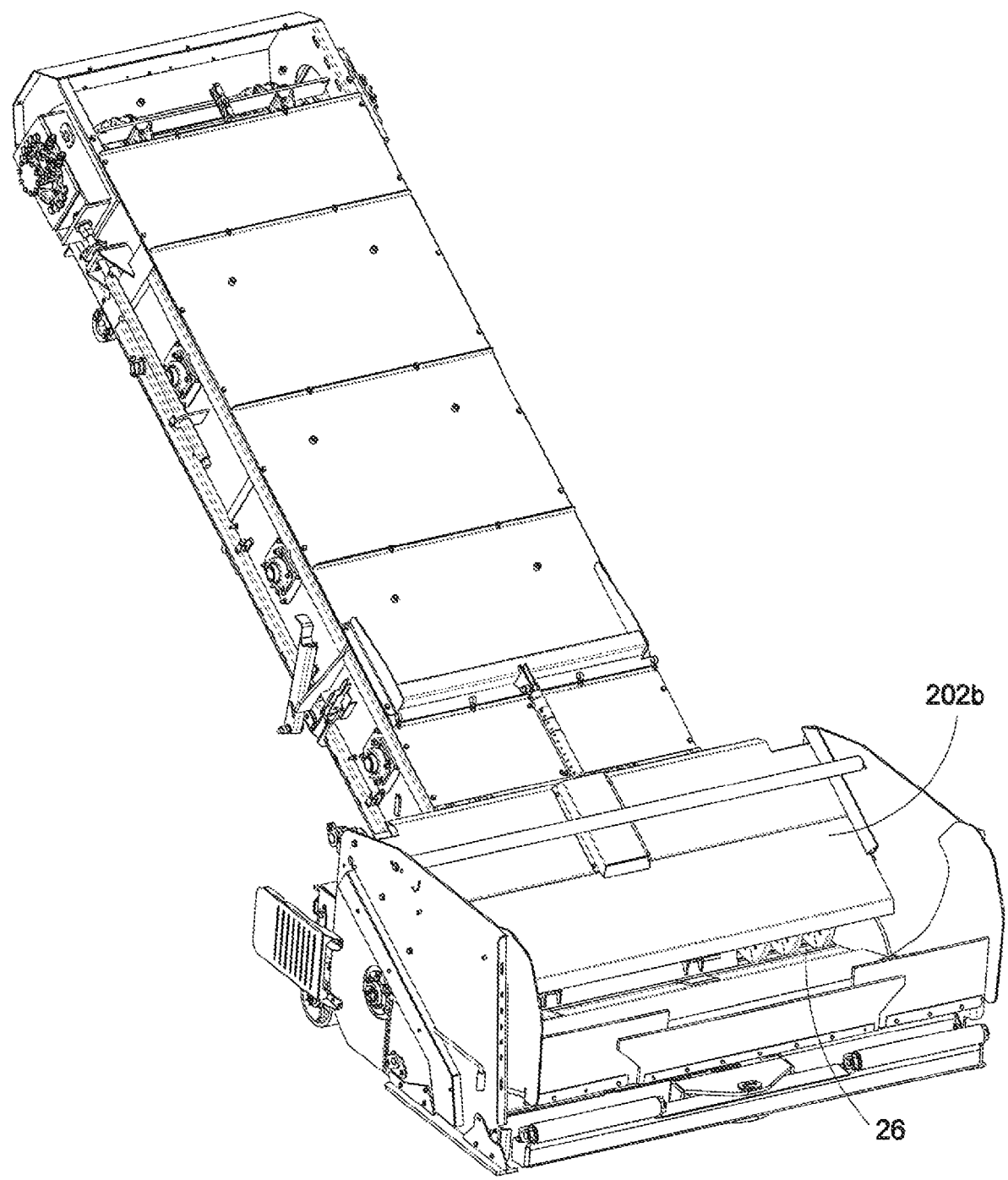
FIG. 6 shows the MTV loading hopper and flow control baffle in a fully closed position to allow flow control.
Figure 7:
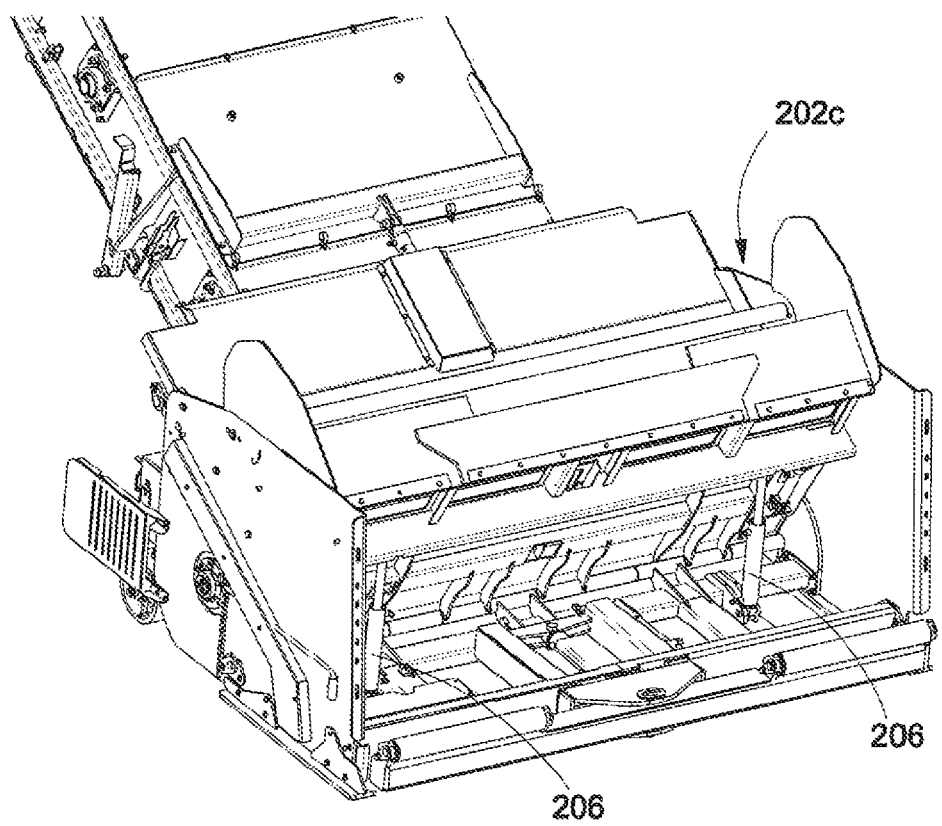
FIG. 7 shows the MTV loader hopper closed and raised to facilitate flow of material into augers.
Figure 8A:
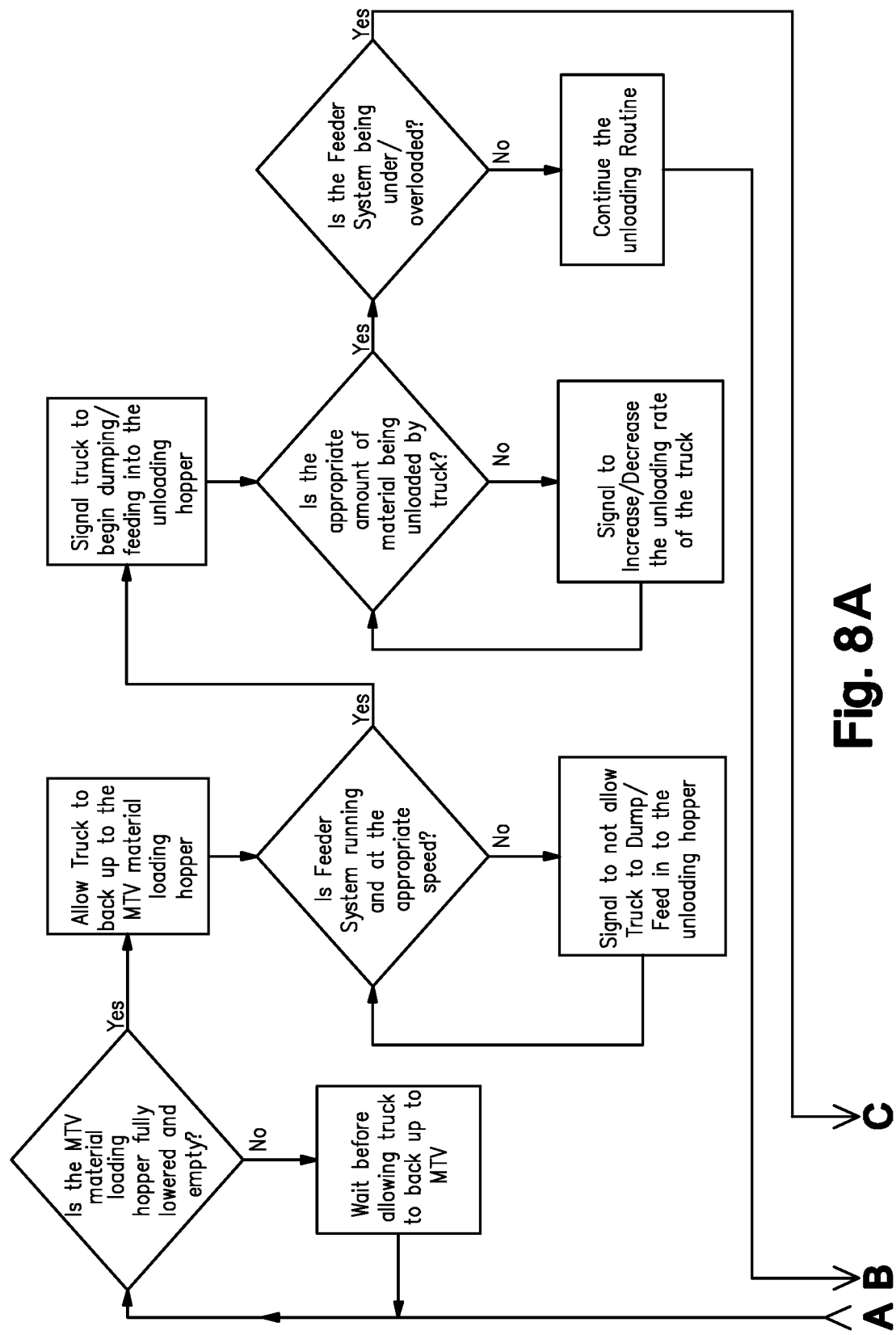
FIG. 8A comprises a flow chart illustrating an auto-dump routine.
Figure 8B:
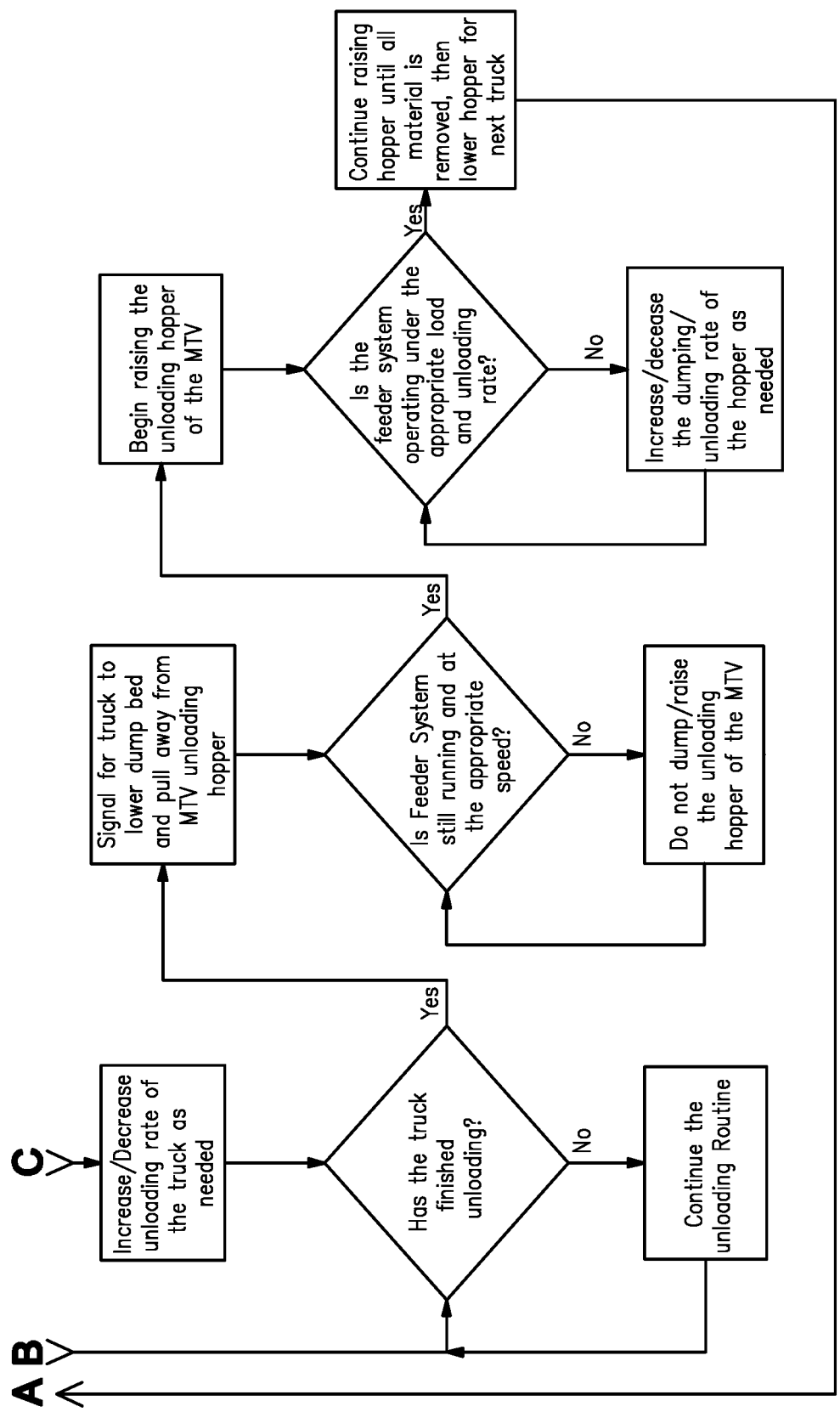
FIG. 8B is a continuation of FIG. 8A which is a flow chart illustrating an auto-dump routine.

Referring now to FIGS. 5-7, the loading hopper 18 of the material transfer vehicle (MTV) 14 of the present invention may be improved to optionally include a moveable flow control baffle to provide improved means to dump material 1 from the improved loading hopper. Further the improved loading hopper is associated with a material conveying system 204 comprising a power source which may be the motor 34 associated with the material conveying system 204 (in ways that would be understood by one of ordinary skill in the art), and means to tip or tilt 206 the loading hopper 18 while changing the position of the flow control baffle thereby adjusting the material flow into the first feeder 20 of the MTV 14. Preferably, the MTV 14 is equipped with an onboard computer which may be the ECM 46 or other similar means for initiating (and, in some embodiments controlling) an unloading sequence or dump routine to manage dumping the hopper 18. The unloading sequence or dump routine is illustrated in detail by FIG. 8.

Prior to initiating the unloading sequence, the loading hopper 18, the flow control baffle, and the means to tip or tilt the loading hopper 206 each exist in an initial condition or first status 18a, and 202a respectively. The unloading sequence may be initiated by an operator or may be initiated by a toggle or "condition" signal that indicates the vehicle 12 that was unloading material into the hopper 18 is no longer unloading or has moved out of an unloading position. The toggle signal may be generated by something as simple as an electronic eye monitoring the flow of material or the presence of the truck or may, alternatively, be determined by employing sensors pertaining to detected flow rate that detect when new material 1 is no longer being unloaded/added to the hopper 18 or, alternatively, may be the result of an action of the operator.

Once the truck 12 finishes unloading into the hopper 18 as determined by receipt of a second signal, (which may be determined by the ECM 46 by monitoring system pressure of the motors on the conveyor circuit, employing a sensing eye, or monitoring or detecting pressure in the dump hopper lifting circuit and comparing to pre-determined value ranges or by detecting a Boolean indicator such as on/off, running/stopped) and thereafter the hopper 18 is "empty" or emptied enough the onboard computer or ECM 46 initiates the unloading sequence or routine to cause the hopper 18 to become more fully emptied. The routine comprises employing the motor 34 to cause power to be supplied via hydraulic pressure or other means so that means to tip 206 the unloading hopper 18 can tilt the hopper 18 for unloading. The routine or sequence positions the flow control baffles and the degree that the hopper 18 is tilted by using means to tip or tilt 206 relative to a detected material flow rate. In some embodiments, the routine causes the onboard computer or ECM 46 to monitor the material flow rate and adjust a first status of a source of power (which may comprise a motor) and flow control baffles 202a to a second status 205b and 202b, respectively, and the means to tip or tilt 206 from a first status to a second status or positions therebetween, relative to a desired range of material flow rate while the hopper 18 is being emptied. Flow rate may be determined by speed of the feeder system 20, 22 of the MTV 14 receiving material 1 from the hopper 18, or monitoring the pressure, load, amperage of the feeder system 20, 22 of the MTV 14 receiving material. Alternatively, rather than adjusting or managing the flow rate while the hopper clean out routine is conducted, flow may be considered in a flow or no-flow Boolean arrangement; if the sensor detects flow, the hopper 18 remains tilted and/or the dumping portion of the routine continues. Upon detecting no material flow, the onboard computer or ECM 46 applies the remaining unloading sequence/routine 210 to return the flow control baffles to their ready positions 202a, return the hopper 18 to its loading degree of tilt, and turn off or otherwise adjust the motor 205.

In another embodiment rather than detecting just the presence or absence of a condition, a sensor 42 or sensors may be configured to wirelessly transmit a signal or signals to the electronic controller 46. For example, if the storage hopper 24 of the material transfer vehicle 14 becomes full, the controller 46 may be configured to receive a signal from sensor 42 readings to indicate the present level of material 1, and, upon receiving signals that indicate the material 1 has reached a pre-set level in the hopper 24 the controller 46 may shut off the first feeder 20 to prevent further asphalt material 1 from being loaded into the storage hopper 24 of the material transfer vehicle 14. This kind of signal may, alternatively, or additionally, also be communicated over a wire installed on the equipment or via other known means.

Alternatively, other signals or indicators related to the full or empty status of the hopper 24 may be received by the controller 46. The controller 46 may, in response, compare the signal to known or expected values, thereafter adjusting the feeders 20, 22 or other mechanism to control the rate of loading or unloading the storage hopper 24 or, as described herein, signal the need to initiate travel of a material-filled truck 12 toward the paving train 100 to provide just-in-time delivery of material 1 to the hopper 18.

In either the sensor embodiment or the indicator condition embodiment, allowing the transport, refill or dump trucks 12 (See 12 at FIG. 1) to dump paving material 1 into the loading hopper 18 of the MTV 14 versus the traditional method of dumping the trucks 12 directly into the hopper 50 of the paver 16 provides a timing mechanism intended to address the issues otherwise expected with regard to road quality which will result from an inconsistent paving routine. Without the use of an MTV 14, ill-timed contact between the paver 16 and the transport truck 12 can cause defects in the road surface quality. Employing either of the assemblies and methods disclosed herein will provide automated aspects which will optimize the process with less operator involvement thereby increasing the efficiency of the paving process.

In some embodiments, the storage hopper 24 may be designed to maximize gravitational assistance comprising, e.g., sloped floors for unloading and/or may be equipped with mechanics such as an unloading feeder mechanism (herein also described as the middle feeder) to assist in the unloading of the material 1 from the storage hopper 24. Such mechanics may include chains across the floor of the storage hopper which are associated with a power take-off as is known in the art or other known means to rotate the chains across the floor and around a set of sprockets, thereby facilitating movement of the material 1 in the storage hopper 24 that is loaded on the chains to the feeder 22. Moveable shovels or slats along the floor of the hopper 24 may be alternatively employed as a feeder mechanism. The feeder 22 of embodiments of the present invention comprises an auger system 26 or other similar system designed to move particulate matter such as the material 1 to the hopper 50 on the paver 16. Mechanics in other embodiments may employ gravity by using cylinders to tip the storage hopper 24 upward or employ slidable doors in the floor 6 of the storage hopper as is known in the art. And there are still other means known in the art to be employed to assist unloading of heavy particulate material 1 that tends to clump, aggregate, or settle.

Additional Embodiments

The present invention may further comprise means to manage or monitor the level of material 1 in the storage hopper 24 wherein said means may be as simple as a level detector, which may be mechanical or electrical (as previously described), and/or incorporate a host of other factors to determine the amount of material in the hopper. This embodiment of the present invention further comprises means to actuate the mechanics to assist in the unloading of the material 1 from the storage hopper 24, as needed to manage the timing aspects necessary to maintain a constant supply of material 1 as needed by the paver 16 for a nonstop paving operation.

Specifically, in this embodiment, the means to monitor and maintain adequate asphalt 1 in the hopper 50 of the paving machine 16 or a storage hopper 24 of a material transfer device 14 further comprises the means to control 46 or controller 46. Said means to control 46 receives and compares measurements of at least one operational input selected from the group comprising chain speed, feeder system pressure, pressure in a hydraulic circuit for the motor that drives the conveyor chains or hoppers that employ chained mechanisms to assist in unloading the hopper or the speed/rate of another feeder system, loading hopper 18 position, geographic location and, if it comprises a loading hopper 18 that can be raised or raised on one end, its height or position relative to its highest possible position, motor speed (e.g., of motors 34 running augers 26 and/or conveyors 20, 22 as an indicator of drag), weight of asphalt material 1 in the MTV storage hopper 24, and/or dump cylinder pressure on the paving machine 16 and/or the MTV 14. Comparing these measurements to each other and/or to acceptable known ranges allows the means to control 46 to determine when the hopper 24 is nearing a pre-set level of material loaded and then adjust operational inputs to control the rate of application in order to conserve and manage material for consistent application.

In one embodiment, a pressure transducer is added to the loading hopper 18 on the MTV 14, a hydraulic valving circuit and that transducer are employed to monitor lifting pressure of the loading hopper 18 of the MTV 14. The pressure transducer sends one or more signals to said means to control 46. Means to control 46 may monitor the weight of material, dump cylinder pressure, pump output, chain speed, and/or circuit pressure. Means to control 46 may receive signals to allow it to measure the loading or unloading rate of the loading hopper 18 on the MTV, or to receive a signal to engage the unloading sequence of the hopper 18. An alternative means to control the unloading sequence may include monitoring the presence of a truck 12 unloading into the hopper 18 which may be accomplished via GPS locator systems or via simple motion detectors, or paired, near-distance signal emitter/receiver pairs or other means known in the art. Signals that indicate the speed of the system 20 that is receiving material from the hopper 18 may also be considered by said means to control 46; such signals may indicate pressure, load, amperage. Upon receiving measurements that said means to control 46 has been programmed to recognize as indicating the hopper 18 is empty or nearing empty, said means to control 46 causes adjustment of one or more operational inputs to control the rate of unloading the hopper 18 or 50 and to accommodate for any relative changes of any measurements of said at least one operational input.

Means to control 46 could really be any electronic device that is capable of receiving a signal, and outputting a signal based on controls logic/algorithms. Typically, the term micro-controller covers a wide range of systems all of which may be employed here. Said means to control 46 in the present invention adjusts at least one or more of the operational inputs to control the rate of unloading the storage hopper 24 for the purpose of maximizing efficiency and avoiding or minimizing dump routine problems.

Dump routine problems to be avoided may include stalling of the auger system 26 or damage to the feeder mechanism 20, 22 which includes augers, chains, conveyors, and/or belts. Means to control 46 may comprise a machine controller 46 for receiving signals 44 regarding the aforementioned measurable operational inputs 19, 19 a-19 h, applying an algorithm 70 to one or more of those signals 44, and calculating the correct time 72 to send outputs/signals. These signals may comprise controller 46-generated or transmitted signals 48 (which differ from signals 44 which are received by the controller, not generated by it) sent to a hydraulic valving circuit 80 that controls the hopper 18 raising/lowering cylinders 206. Means to control 46 also monitors the detectors for any issues that may occur and may shut down the dump routine for out of-range operations. In one embodiment, the valving requirement is met by a proportional valve. In this arrangement, said means to control 46 adjusts the dumping rate according to detected values compared with acceptable ranges.

The means to control 46 monitors (either continuously or periodically) some or all of the following: whether the chains 30, used to empty the hopper 24 or 50 are running, the speed with which they are running, the hydraulic pressure and/or amperage of the circuit that drives the system, the dump cylinder pressure, the motor speed of the auger/conveyors 26, 20, 22 and/or the translational speed 84 of the paving machine or paver 16 all as a means to determine and predict when and where the MTV storage hopper 24 or the paver hopper will reach empty. The means to control 46 compares each of the various measurements to an expected and/or normal range for the desired operation; determines the appropriate speed to efficiently empty the hopper 24 or 50; and predicts when the hopper 24 will be and/or is cleaned out. The means to control 46 monitors the motor speed and pressure/amperage of an auger circuit 82 employed to run the augers and/or conveyors 26, 20, 22; it measures dump cylinder pressure, geographic position of the MTV hopper 24, and presence, level, or amount of asphalt material 1 in the MTV hopper 24. Said means to control 46 compares these measurements with the speed of the hopper's translational movement 84, takes into account the distance between the MTV storage hopper 24 and a refill truck 12, along with the level of material 1 within the hopper of the paver and, employing the algorithm, calculates and predicts when and where the MTV storage hopper 24 will reach an empty status (or a "refill due" status). Said means to control 46 then dictates, based on the algorithm or a sub-portion of algorithm where the algorithm takes into account the expected speed of travel of the reloading vehicle or refill truck 12 and the distance between the MTV 14 or other vehicle that holds and transfers asphalt or paving material 1 or, if no MTV 14 is employed, the distance to the paving machine 16 along the paving route, and the estimated or known load time required to fill the refill truck 12, and the time by which the hopper 24 on the MTV 14 (or the hopper on the paving machine 16) should be fully loaded and determines a start time for when the refill truck 12 should begin loading, be fully loaded, and when it should begin travel toward the MTV 14 (or paving machine 16 when no MTV is present). Monitoring these factors facilitates prediction of a time to begin filling the MTV hopper 18 (or the paver's hopper) in order to finish just-in-time to continually provide material 1 to the storage hopper 24 of the MTV 14 and, thereafter, to the hopper of the paver 16. The predictive capabilities provide means to avoid, without slow down, cool down, or stoppage of laying the asphalt which, in turn, minimizes damage, and increases efficiency of unloading/loading routines while maintaining the desired quality of the road mat 102 and resulting road.

If the means to control 46 detects that the level of asphalt material 1 in the MTV hopper 24 (or hopper on the paving machine 16 when no MTV is employed) is below a preset level (or other volume indicator as previously discussed herein), it can signal the paving machine 16 to slow its rate of application. Slowing the application rate will prevent the MTV 14 hopper 24 (or paving machine 16 hopper when no MTV is employed) from running out of material 1 before the new material 1 is delivered to the MTV 14 (or to the hopper on the paving machine 16). Further, managing the rate prevents subsequent stoppage of the paving train 100 comprising the paving machine 16 and, optionally, the MTV 14. Slowing the rate and preventing stoppage avoids the decrease in the quality of the road mat 102 otherwise expected if the material 1 cannot be consistently laid.

The invention claimed is:

1. An apparatus for removing paving material from a loading hopper of an MTV, said apparatus comprising:
a first actuator configured to tilt the loading hopper; and
an electronic control module configured to receive a signal from an operator and initiate an unloading sequence when at least one predetermined operating condition is met, the unloading sequence controlling the first actuator to tilt the loading hopper with respect to a feeder of the MTV based on the operating condition of the MTV to move the paving material from the loading hopper to the feeder of the MTV and thereafter controlling the first actuator to return the hopper to its previous position.

2. The apparatus of claim 1, wherein the operating condition of the MTV is at least one of feeder speed, feeder pressure, hopper position, truck presence, material flow rate, hopper tipped status, motor speed, weight of the hopper, and dump cylinder pressure.

3. The apparatus of claim 1, further comprising:
a moveable control baffle; and
a second actuator configured to move the moveable control baffle, wherein the electronic control module is configured to control the second actuator to move the moveable control baffle from a first position where an opening of the feeder is at least partially covered by the moveable control baffle to a second position where the opening of the feeder is substantially exposed by the moveable control baffle.

4. The apparatus of claim 1, wherein the operating condition is feeder speed.

5. The apparatus of claim 1, wherein the operating condition is a preset feeder speed.

6. The apparatus of claim 1, wherein tilting the loading hopper is performed at a variable rate.

7. An apparatus for moving paving material from a loading hopper of an MTV to a feeder of the MTV, said apparatus comprising:
an electronic controller configured to receive a signal from at least one sensor configured to detect a condition related to a level of material in the loading hopper; and
a means to tilt the loading hopper with respect to the feeder to transfer the paving material directly from the hopper to the feeder of the MTV, wherein the means to tilt the loading hopper is controlled by the electronic controller based on a sensed operating condition of the MTV and wherein the electronic controller is configured to execute an unloading operation when it is detected that a truck moves away from the apparatus.

8. The apparatus of claim 7, wherein when said condition is detected, the controller initializes a process of unloading the hopper.

9. The apparatus of claim 8, wherein the process of unloading the hopper comprises: actuating the means to tilt the loading hopper to unload material into the feeder, and upon detection that the hopper is adequately unloaded, returning the hopper to its former position.

10. A material transfer vehicle comprising:
a first feeder;
a tiltable hopper arranged at an end of the first feeder, the tiltable hopper being configured to tilt from a first position to receive paving material from a truck to a second position where paving material in the tiltable hopper is dumped for reception by the first feeder;
a moveable control baffle having a second position configured to expose an opening of the first feeder and a first position configured to cover at least a portion of the opening of the first feeder;
a first actuator configured to move the moveable control baffle;
a second actuator configured to tilt the tiltable hopper from the first position to the second position and from the second position to the first position; and
an electronic control module configured to receive a signal from an operator and initiate an unloading sequence when at least one predetermined operating condition is met, the unloading sequence controlling the second actuator to tilt the loading hoper with respect to the first feeder of the material transfer vehicle based on the operating condition of the MTV to move the paving material from the loading hopper to the feeder of the MTV and thereafter controlling the second actuator to return the hopper to its previous position.

11. The material transfer vehicle of claim 10, wherein the operating condition is at least one of feeder speed, feeder pressure, hopper position, truck presence, material flow rate, hopper tipped status, motor speed, weight of the hopper, and dump cylinder pressure.

12. The material transfer vehicle of claim 11, wherein the electronic control module is configured to control the first actuator to move the moveable control baffle.

13. The material transfer vehicle of claim 12, wherein the electronic control module is configured to operate the first actuator to move the movable control baffle while operating the second actuator to tilt the tiltable hopper.

14. The material transfer vehicle of claim 10, wherein the sensed condition is a speed the feeder.

15. An apparatus for removing paving material from a loading hopper of an MTV, said apparatus comprising:
a first actuator configured to tilt the loading hopper; and
an electronic control module configured to execute unloading operations when it is detected that a truck moves away from the apparatus, the unloading operations including an operation of detecting whether at least one predetermined operating condition is met, controlling the first actuator to tilt the loading hopper with respect to a feeder of the MTV, and controlling the first actuator to return the hopper to its previous position.

16. The apparatus of claim 15, wherein the operating condition is associated with a feeder speed.

17. The apparatus of claim 15, wherein the operating condition is associated with a feeder speed.

* * * * *